United States Patent
Horii et al.

(10) Patent No.: US 11,180,164 B2
(45) Date of Patent: Nov. 23, 2021

(54) VEHICLE CONTROL APPARATUS, VEHICLE, AND CONTROL METHOD

(71) Applicant: HONDA MOTOR CO., LTD., Tokyo (JP)

(72) Inventors: Hiroaki Horii, Wako (JP); Tadahiko Kanoh, Wako (JP); Jun Ochida, Wako (JP); Nobuharu Nagaoka, Wako (JP); Hirofumi Kanazaki, Wako (JP); Luwei Jia, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/883,471

(22) Filed: May 26, 2020

(65) Prior Publication Data
US 2020/0283021 A1 Sep. 10, 2020

Related U.S. Application Data

(63) Continuation of application No. PCT/JP2017/043046, filed on Nov. 30, 2017.

(51) Int. Cl.
*B60W 60/00* (2020.01)
*B60W 30/18* (2012.01)

(52) U.S. Cl.
CPC .. *B60W 60/0018* (2020.02); *B60W 30/18018* (2013.01); *B60W 30/18109* (2013.01); *B60W 2520/04* (2013.01)

(58) Field of Classification Search
CPC ....... B60W 60/0018; B60W 30/18018; B60W 30/18109; B60W 2520/04
See application file for complete search history.

(56) References Cited

U.S. PATENT DOCUMENTS

| 8,655,546 | B2 | 2/2014 | Natori et al. |
|---|---|---|---|
| 10,156,848 | B1 * | 12/2018 | Konrardy ............. G05D 1/0214 |
| 10,266,167 | B2 | 4/2019 | Kurahashi et al. |
| 10,431,091 | B2 | 10/2019 | Satoh |
| 2012/0078466 | A1 | 3/2012 | Natori et al. |
| 2015/0106007 | A1 * | 4/2015 | Matsumura ............ G01C 21/26 |
| 2017/0120887 | A1 | 5/2017 | Kurahashi et al. |

(Continued)

FOREIGN PATENT DOCUMENTS

| JP | 2007-038954 A | 2/2007 |
|---|---|---|
| JP | 2007-331652 A | 12/2007 |

(Continued)

OTHER PUBLICATIONS

International Search Report for PCT/JP2017/043046 dated Mar. 6, 2018.

*Primary Examiner* — Thomas G Black
*Assistant Examiner* — Brittany Renee Peko
(74) *Attorney, Agent, or Firm* — Thomas | Horstemeyer, LLP (57) ABSTRACT

The present invention provides a vehicle control apparatus for controlling traveling of a vehicle, the apparatus comprising: a stop control unit configured to move the vehicle in a vehicle width direction and stop the vehicle in a traveling state; a notification unit configured to make a notification of the stop of the vehicle; and a change unit configured to change a notification method by the notification unit in accordance with a stop mode of the vehicle stopped by the stop control unit.

17 Claims, 8 Drawing Sheets

(56) References Cited

U.S. PATENT DOCUMENTS

| | | | |
|---|---|---|---|
| 2017/0162051 A1 | 6/2017 | Satoh | |
| 2017/0297567 A1* | 10/2017 | Matsumura | B60W 30/08 |
| 2017/0297569 A1* | 10/2017 | Nilsson | B60W 30/09 |
| 2019/0168734 A1 | 6/2019 | Kurahashi et al. | |

FOREIGN PATENT DOCUMENTS

| | | |
|---|---|---|
| JP | 2012-071677 A | 4/2012 |
| JP | 2015-171851 A | 10/2015 |
| JP | 2016-181031 A | 10/2016 |
| JP | 2017-084140 A | 5/2017 |
| JP | 2017-177932 A | 10/2017 |
| JP | 2017-194861 A | 10/2017 |
| WO | 2015/190329 A1 | 12/2015 |
| WO | 2017/183609 A1 | 10/2017 |
| WO | 2019/106787 A1 | 6/2019 |

* cited by examiner

| NOTIFICATION LEVEL | VOLUME OF HORN | BLINKING PERIOD OF HAZARD LAMPS | BLINKING PERIOD OF TAILLIGHTS |
|---|---|---|---|
| LEVEL 4 | 3 (HIGH) | 4 (SHORT) | 4 (SHORT) |
| LEVEL 3 | 2 | 3 | 3 (LONG) |
| LEVEL 2 | 1 (SMALL) | 2 | OFF |
| LEVEL 1 | OFF | 1 (LONG) | OFF |

VEHICLE CONTROL APPARATUS, VEHICLE, AND CONTROL METHOD

CROSS-REFERENCE TO RELATED APPLICATION

This application is a continuation of International Patent Application No. PCT/JP2017/043046 filed on Nov. 30, 2017, the entire disclosures of which is incorporated herein by reference.

TECHNICAL FIELD

The present invention relates to a control technique for a vehicle.

BACKGROUND ART

PTL 1 discloses a control apparatus that stops a vehicle when, based on an image signal output from a camera for capturing the face of a driver, it is determined that the driver is in a state in which he/she cannot normally drive, and controls the vehicle to alert a vehicle and a pedestrian on the periphery.

CITATION LIST

Patent Literature

PTL 1: Japanese Patent Laid-Open No. 2007-331652

SUMMARY OF THE INVENTION

Technical Problem

Depending on the stop mode of a vehicle (for example, the stop state, the stop environment, or the like of a vehicle), an influence on another vehicle and a pedestrian on the periphery changes. Therefore, the importance and urgency of notifying the periphery of the stop of the vehicle change.

The present invention has as its object to make a notification appropriately when stopping a vehicle.

Solution to Problem

According to the present invention, there is provided a vehicle control apparatus for controlling traveling of a vehicle, the apparatus comprising: a stop control unit configured to move the vehicle in a vehicle width direction and stop the vehicle in a traveling state; a notification unit configured to make a notification of the stop of the vehicle; and a change unit configured to change a notification method by the notification unit in accordance with a stop mode of the vehicle stopped by the stop control unit.

Advantageous Effects of Invention

According to the present invention, it is possible to appropriately make a notification when stopping a vehicle.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate an embodiment of the invention and, together with the description, serve to explain the principles of the invention.

DESCRIPTION OF EMBODIMENTS

Figure 1:
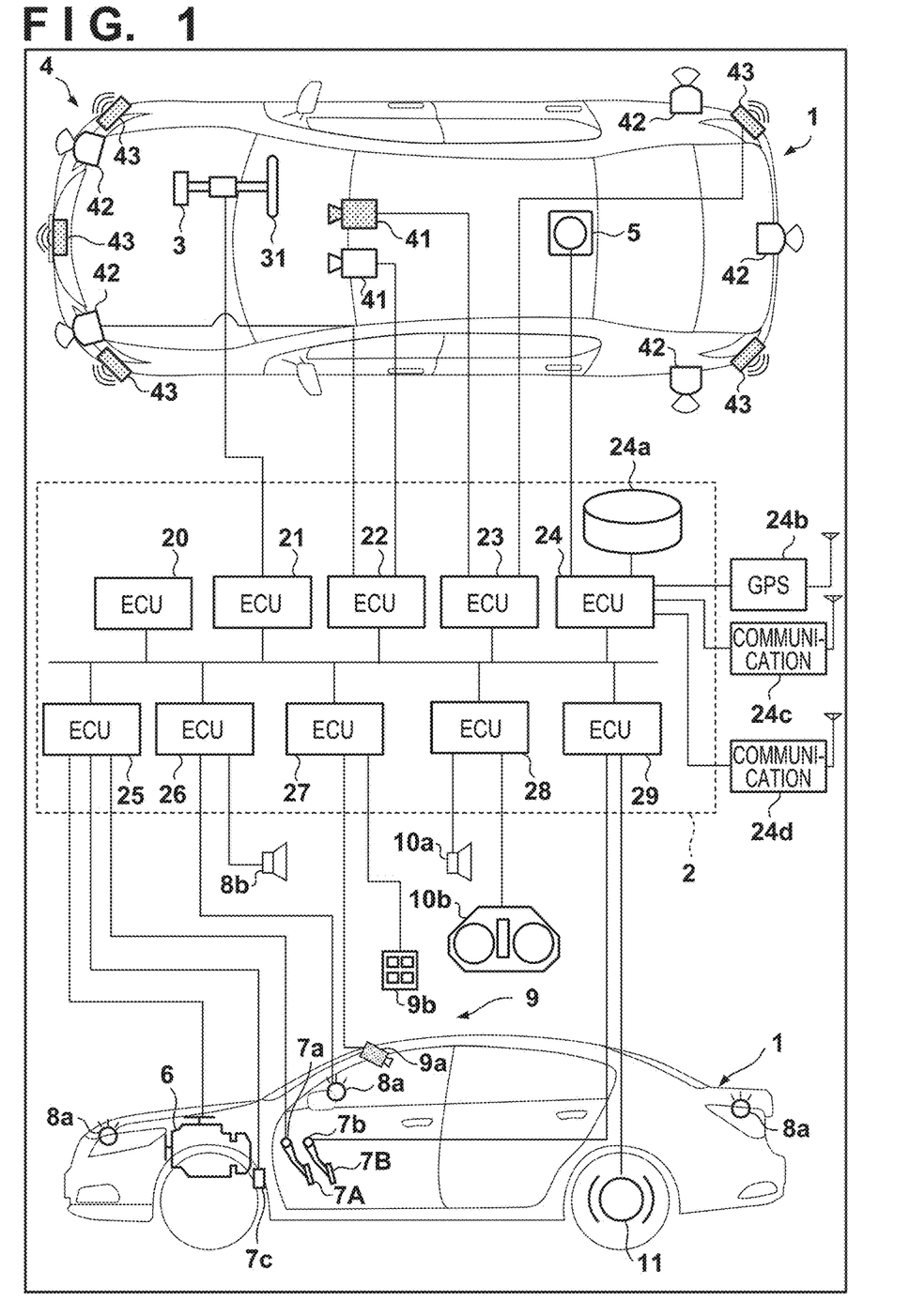
FIG. 1 is a block diagram of a vehicle control apparatus according to an embodiment of the present invention.

FIG. 1 is a block diagram of a vehicle control apparatus according to an embodiment of the present invention. The vehicle control apparatus shown in FIG. 1 is an apparatus that controls automated driving of a vehicle 1. Referring to FIG. 1, an outline of the vehicle 1 is shown in a plan view and a side view. As an example, the vehicle 1 is a sedan-type four-wheeled vehicle.

The control apparatus shown in FIG. 1 includes a control unit 2. The control unit 2 includes a plurality of ECUs 20 to 29 communicably connected by an in-vehicle network. Each ECU includes a processor represented by a CPU, a storage device such as a semiconductor memory, and an interface with an external device. The storage device stores programs to be executed by the processor, data to be used by the processor for processing, and the like. Each ECU may include a plurality of processors, storage devices, and interfaces.

The functions and the like provided by the ECUs 20 to 29 will be described below. Note that the number of ECUs and the provided functions can appropriately be designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, both steering and acceleration/deceleration are automatically controlled.

The ECU 21 controls an electric power steering device 3. The electric power steering device 3 includes a mechanism that steers front wheels in accordance with a driving operation (steering operation) of the driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the advancing direction of the vehicle 1.

The ECUs 22 and 23 perform control of detection units 41 to 43 that detect the peripheral status of the vehicle 1 and information processing of detection results. The detection unit 41 is a camera (to be sometimes referred to as the camera 41 hereinafter) that captures the front side of the vehicle 1. In this embodiment, two cameras 41 are provided at the roof front of the vehicle 1. When images captured by the cameras 41 are analyzed, the contour of a target or a division line (a white line or the like) of a lane on a road can be extracted. This enables the ECUs 22 and 23 to recognize a pedestrian on the front side, the type (a large-sized car, a standard-sized, or the like) of a vehicle on the front side, and road information (a sidewalk, a road shoulder, a traveling road, or the like).

The detection unit 42 is a lidar (Light Detection and Ranging (for example, a laser radar)) (to be sometimes referred to as the lidar 42 hereinafter), and detects a target around the vehicle 1 or measures the distance to a target. In this embodiment, five lidars 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each lidar 42 and information processing of detection results. The ECU 23 performs control of the other camera 41 and each radar 43 and information processing of detection results. Since two sets of devices that detect the peripheral status of the vehicle 1 are provided, the reliability of detection results can be improved. In addition, since detection units of different types such as cameras, lidars, and radars are provided, the peripheral environment of the vehicle can be analyzed multilaterally. Furthermore, each of the ECUs 22 and 23 can also detect the relative speed between the vehicle 1 and a target around the vehicle 1 based on the distance between the vehicle 1 and the target measured by the lidars 42 and the radars 43, or detect the absolute speed of a target around the vehicle 1 further based on the absolute speed information of the vehicle 1.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information or traffic information and acquires these pieces of information. The ECU 24 can access a map information database 24a formed in the storage device. The ECU 24 searches for a route from the current position to the destination. The ECU 24 includes a communication device 24d for inter-vehicle communication. The communication device 24d performs wireless communication with another vehicle on the periphery and performs information exchange between the vehicles.

The ECU 25 controls a power plant 6. The power plant 6 is a mechanism that outputs a driving force to rotate the driving wheels of the vehicle 1 and includes, for example, an engine and a transmission. The ECU 25, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 25 automatically controls the power plant 6 in correspondence with an instruction from the ECU 20 and controls the acceleration/deceleration of the vehicle 1.

The ECU 26 controls lighting devices (headlights, taillights, and the like) including direction indicators 8a (turn signals), and an output unit 8b (for example, a horn, a loudspeaker, or the like) that outputs a voice outside the vehicle. In the example shown in FIG. 1, the direction indicators 8a are provided in the front portion, door mirrors, and the rear portion of the vehicle 1. If notification devices (for example, police car lights and the like) other than the direction indicators 8a and the output unit 8b are provided in the vehicle 1, the ECU 26 also controls these notification devices.

The ECU 27 performs control of a detection unit 9 that detects the status in the vehicle and information processing of a detection result. As the detection unit 9, a camera 9a configured to capture the inside of the vehicle and an input device 9b configured to accept input of information from an occupant in the vehicle are provided. In this embodiment, the camera 9a is provided at the roof front of the vehicle 1, and captures the occupant (for example, the driver) in the vehicle. The input device 9b is a switch group arranged at a position where the occupant in the vehicle can operate the device and configured to input instructions to the vehicle 1. As the detection unit 9, a biosensor that detects the perspiration amount and heart rate of the driver may be provided. This enables the ECU 27 to detect the state (biological information) of the driver based on a face image of the driver captured by the camera 9a, the perspiration amount and heart rate of the driver detected by the sensor, and the like.

The ECU 28 controls an output device 10. The output device 10 outputs information to the driver and accepts input of information from the driver. A voice output device 10a notifies the driver of the information by a voice. A display device 10b notifies the driver of information by displaying an image. The display device 10b is arranged, for example, in front of the driver's seat and constitutes an instrument panel or the like. Note that although a voice and display have been exemplified here, the driver may be notified of information using a vibration or light or notified of information by pulling a seatbelt. Alternatively, the driver may be notified of information by a combination of some of the voice, display, vibration, and light. Furthermore, the combination or the notification form may be changed in accordance with the level (for example, the degree of urgency) of information of which the driver is to be notified.

The ECU 29 controls a brake device 11 and a parking brake (not shown). The brake device 11 is, for example, a disc brake device which is provided for each wheel of the vehicle 1 and decelerates or stops the vehicle 1 by applying a resistance to the rotation of the wheel. The ECU 29, for example, controls the operation of the brake device 11 in correspondence with a driving operation (brake operation) of the driver detected by an operation detection sensor 7b provided on a brake pedal 7B. If the driving state of the vehicle 1 is automated driving, the ECU 29 automatically controls the brake device 11 in correspondence with an instruction from the ECU 20 and controls deceleration and stop of the vehicle 1. The brake device 11 or the parking brake can also be operated to maintain the stop state of the vehicle 1. In addition, if the transmission of the power plant 6 includes a parking lock mechanism, it can be operated to maintain the stop state of the vehicle 1.

In automated driving of the thus configured vehicle 1, if, for example, the consciousness of the driver deteriorates or the performance of the vehicle 1 (for example, the sensor) degrades, the vehicle 1 in a traveling state, which is traveling on a traveling lane, may be stopped, and another vehicle and a pedestrian on the periphery may be notified that the vehicle 1 is stopped or is to be stopped. When stopping the vehicle 1 in this way, control can be executed so that the vehicle 1 is movable in a vehicle width direction. However, since an influence on another vehicle and a pedestrian on the periphery changes depending on the stop mode of the vehicle 1 (for example, the stop state, the stop environment, or the like of the vehicle 1), the degree of importance and the degree of urgency of notifying the periphery change.

Figure 2A:
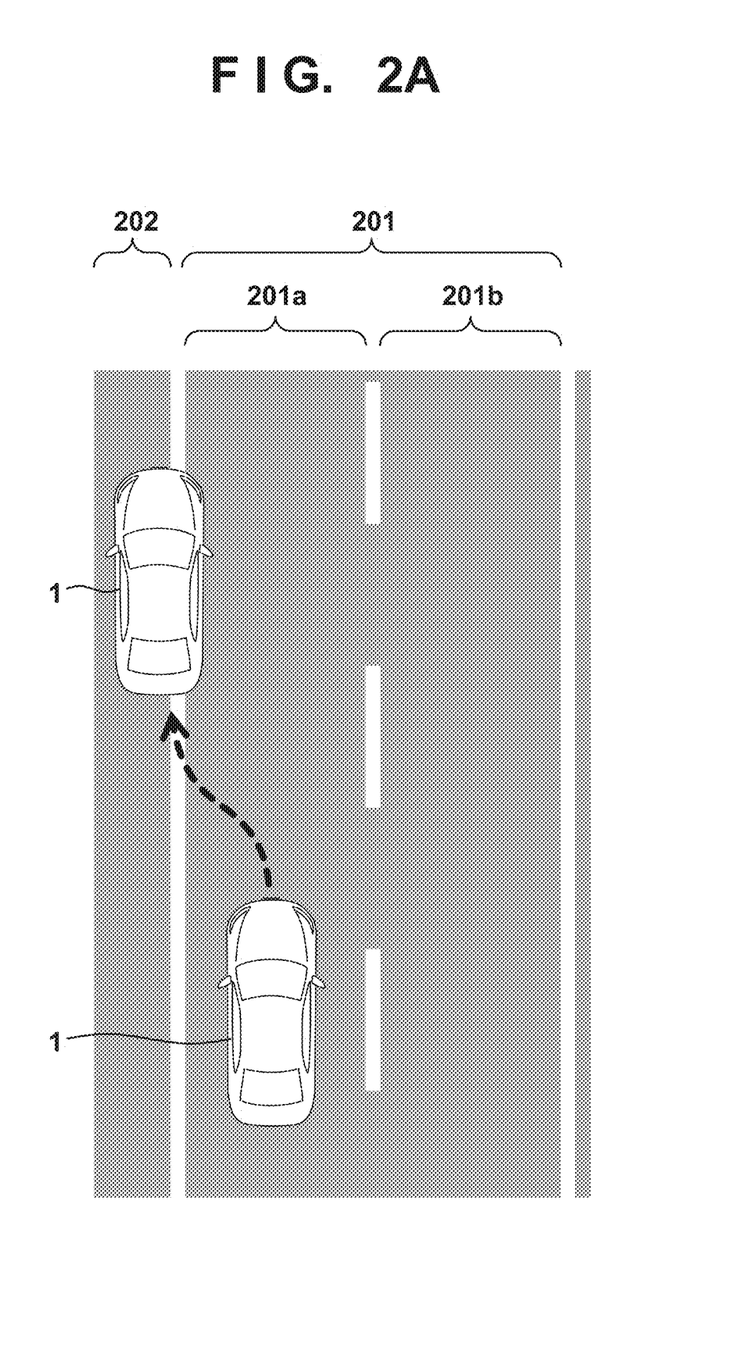
FIG. 2A is a schematic view for explaining the stop position of a vehicle according to the embodiment.
Figure 2B:
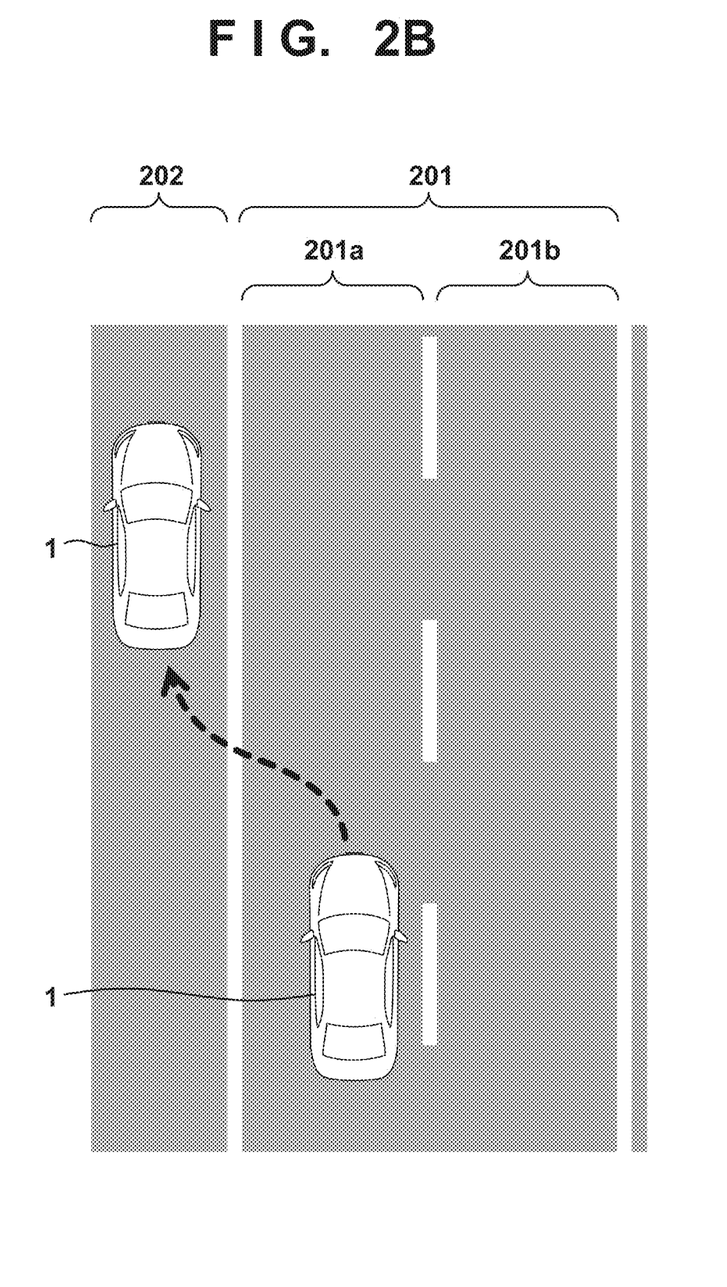
FIG. 2B is a schematic view for explaining the stop position of the vehicle according to the embodiment.

As shown in, for example, FIGS. 2A and 2B, assume that the vehicle 1 travels on a keep-left road including a traveling road 201 with two traveling lanes 201a and 201b and an adjacent zone 202 (for example, a road side strip or a road shoulder) adjacent to the left of the traveling road 201. In an example shown in FIG. 2A, the width of the adjacent zone 202 is narrower than the vehicle width. Even if the vehicle 1 is decelerated and stopped while being moved in the vehicle width direction (leftward), the overall vehicle 1 cannot be located within the adjacent zone, and part of the vehicle 1 crosses over the traveling lane 201a. In this case, since an influence on a following vehicle traveling on the traveling lane 201a is large, it is preferable to make a notification so as to make the following vehicle quickly recognize that the vehicle 1 is stopped. On the other hand, in an example shown in FIG. 2B, since the width of the adjacent zone 202 is sufficiently wider than the vehicle width, the vehicle 1 can be stopped so that the overall vehicle 1 is located within the adjacent zone 202. In this case, since, as compared with the example shown in FIG. 2A, the influence on the following vehicle travelling on the traveling lane 201a is small, if a notification is made to the following vehicle at the same notification level as in FIG. 2A, this may be troublesome for the driver of the following vehicle, thereby distracting the attention of the driver.

Figure 3:
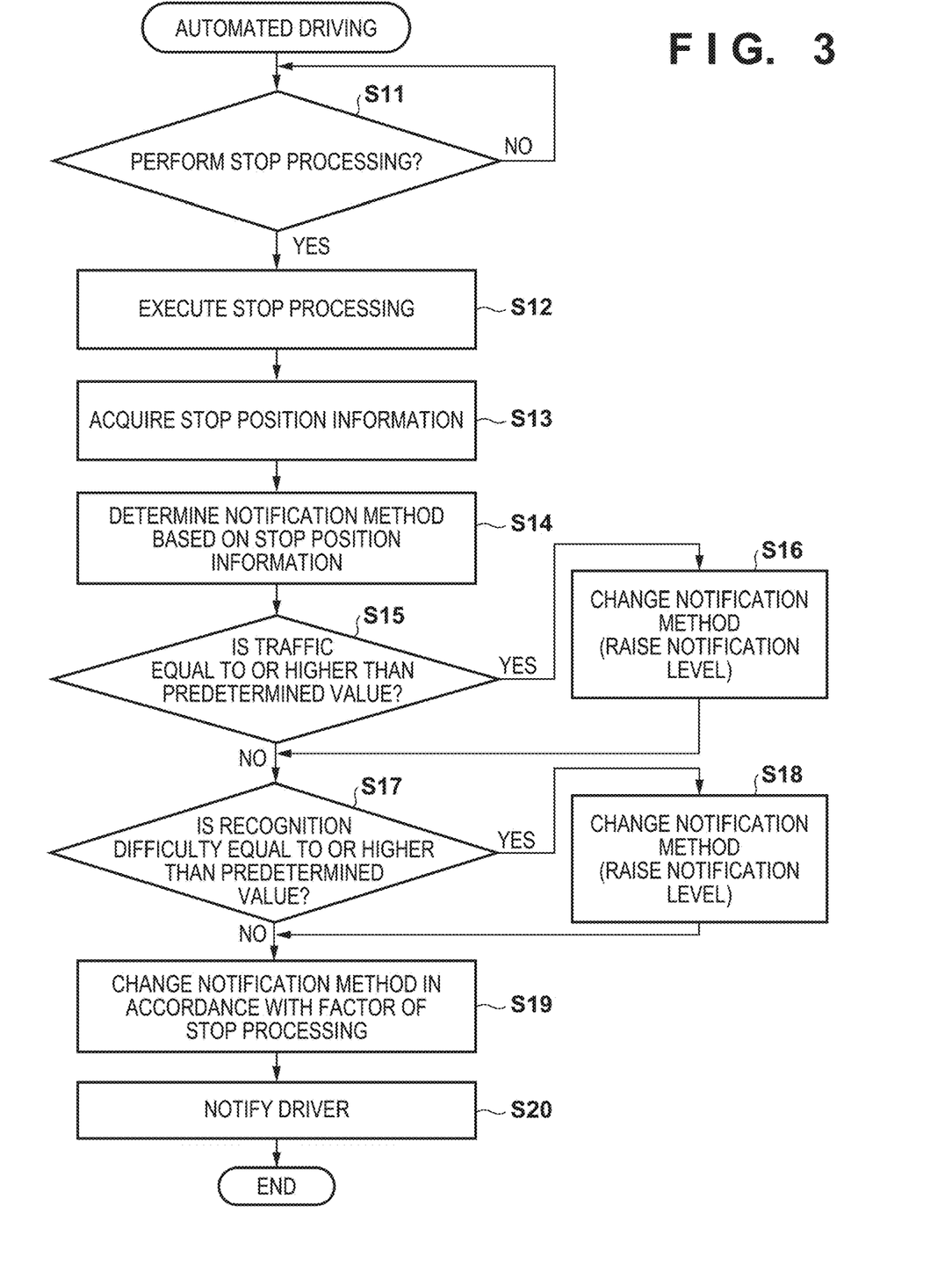
FIG. 3 is a flowchart illustrating an example of control of the vehicle according to the embodiment.

To solve this problem, when the vehicle 1 traveling on the traveling lane is to be stopped (or is stopped) by being moved in the vehicle width direction, the ECU 20 according to this embodiment changes a notification method (notification form) in accordance with the stop mode of the vehicle 1. An example of control of the vehicle 1 executed by the ECU 20 according to this embodiment will be described with reference to FIG. 3. FIG. 3 is a flowchart illustrating an example of control of the vehicle 1 executed when, for example, the driver of the vehicle 1 instructs automated driving. This embodiment will describe an example of changing the notification method in accordance with the stop mode of the vehicle 1 in the vehicle width direction. However, the notification method may be changed in accordance with the stop mode of the vehicle 1 in the traveling direction (the front-and-rear direction of the vehicle 1. In addition, the ECU 20 functions as the control apparatus of the vehicle 1.

In step S11, the ECU 20 determines whether to perform stop processing of stopping the vehicle 1 in the traveling state. For example, if a predetermined condition is satisfied during automated driving of the vehicle 1, the ECU 20 determines to perform the stop processing when the driver is notified of driving takeover but does not respond to the notification, and advances to step S12. Note that if the driver responds to the driving takeover notification, the ECU 20 may end automated driving and switch to manual driving by the driver. On the other hand, if the predetermined condition is not satisfied during automated driving of the vehicle 1, the ECU 20 determines not to perform the stop processing, and repeats step S11.

The predetermined condition in step S11 will be described. For example, the ECU 20 determines to perform the stop processing under the condition that the detection accuracy of the peripheral status of the vehicle 1 is equal to or lower than a threshold due to a degradation in performance or function of the sensor (for example, the detection units 41 to 43) for detecting the peripheral status of the vehicle 1. The degradation in performance (function) of the sensor can include a degradation in performance caused by the deterioration of an environment between the sensor and the target by an external factor such as the weather, and a degradation in performance caused by the fogging of the cover or lens of the sensor, in addition to a degradation in performance caused by the sensor itself such as a change of the attachment angle of the sensor. The ECU 20 may determine to perform the stop processing under the condition that the detection unit 9 (for example, the camera 9a or the biosensor) for detecting the state of the driver detects the deterioration of the consciousness of the driver.

In step S12, the ECU 20 executes the stop processing. At this time, control can be executed so that the vehicle 1 is movable in the vehicle width direction. For example, as shown in FIGS. 2A and 2B, the ECU 20 decelerates and stops the vehicle 1 while moving the vehicle 1 in the vehicle width direction (leftward) so that the vehicle 1 is arranged on the adjacent zone 202 as much as possible.

In step S13, the ECU 20 acquires, as the stop mode of the vehicle 1, information (to be sometimes referred to as stop position information hereinafter) about the stop position of the vehicle 1 to be stopped (or the vehicle 1 stopped) in step S12. For example, based on the detection results of the detection units 41 to 43, the GPS sensor 24b, and the like, the ECU 20 can obtain, as the stop position (stop state) of the vehicle 1, a relative position between the vehicle 1 stopped in step S12 and the traveling lane 201a and a deviation amount, to the traveling lane 201a, of the vehicle 1 stopped in step S12.

In step S14, based on the stop position information acquired in step S13, the ECU 20 determines (changes) the notification method for notifying another vehicle, a pedestrian, and the like on the periphery of the stop of the vehicle 1. For example, the ECU 20 can determine the notification method so that a notification level is higher as the relative position, detected as the stop position, between the vehicle 1 and the traveling lane 201a (for example, the center of the traveling lane 201a) is closer. Furthermore, the ECU 20 can determine the notification method so that the notification level is higher as the deviation amount detected as the stop position is larger.

Examples of a notification device (notification unit) usable for notification are the output unit 8b such as a horn or a loudspeaker, lighting devices (hazard lamps, headlights, taillights, and the like) such as the direction indicators 8a, and the communication device 24d (inter-vehicle communication). As the notification devices, a means for automatically installing a warning triangle, a smoke candle, and the like, police car lights, a horn, and the like may be provided. The ECU 20 changes the notification method in accordance with a volume output from the output unit 8b, the type of the device used for notification among the above notification devices, the blinking period of the lighting devices such as the direction indicators 8a, or the like.

Figure 4:
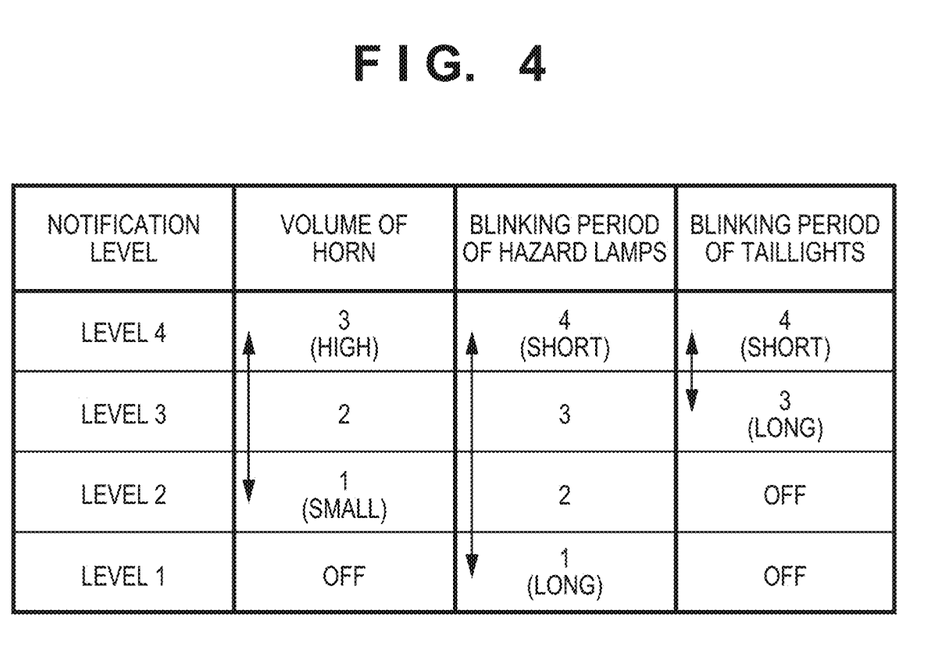
FIG. 4 is a table showing an example of correspondence between a notification level and a notification method.

An example of determining the notification level in accordance with the stop position of the vehicle 1 will be described with reference to FIG. 4. FIG. 4 is a table showing an example of correspondence between the notification level and the notification method. In an example shown in FIG. 4, as the notification method, the volume of the horn, the blinking period of the hazard lamps, and the blinking period of the taillights. Furthermore, in the example shown in FIG. 4, four notification levels at which the notification method changes in stages are shown. The number of notification levels is not limited to four, and the notification method need not change in stages (that is, the notification method may change continuously).

Figure 5A:
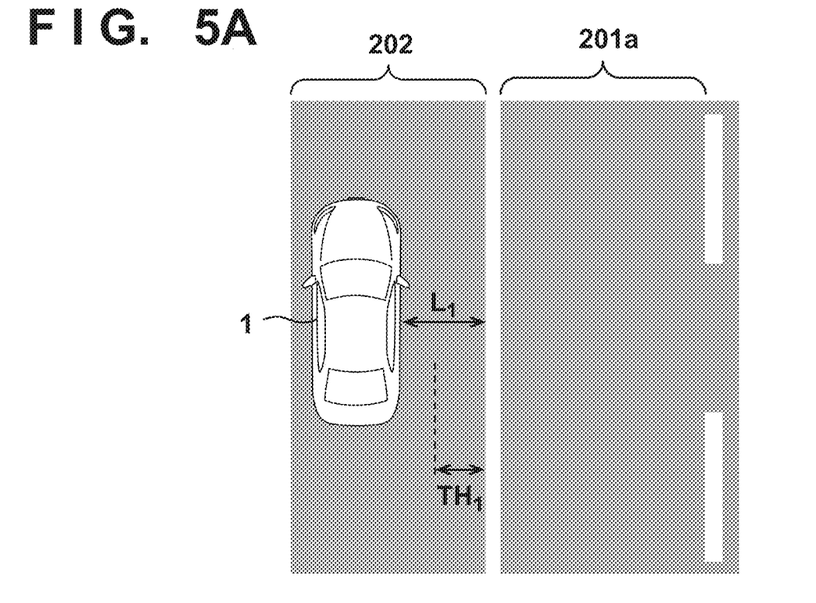
FIG. 5A is a schematic view showing an example of the stop position of the vehicle.
Figure 5B:
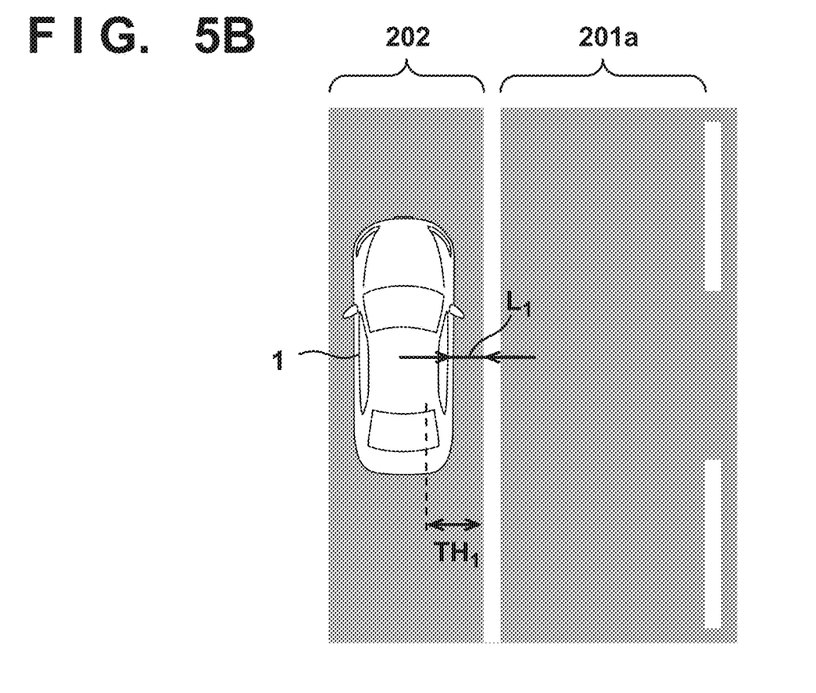
FIG. 5B is a schematic view showing another example of the stop position of the vehicle.

If, for example, the width of the adjacent zone 202 is sufficiently larger than the vehicle width, and the relative position between the vehicle 1 and the traveling lane 201$a$ is in a state shown in FIG. 5A (a distance $L_1$ between the vehicle 1 and the traveling lane 201$a$ is equal to or longer than a first threshold $TH_1$ ($L_1 \geq TH_1$), the ECU 20 determines level 1 as the notification level. At level 1, only the hazard lamps are blinked at "period 1", and neither the horn nor the taillights are used as the notification devices. If the relative position between the vehicle 1 and the traveling lane 201$a$ is in a state shown in FIG. 5B ($0 < L_1 < TH_1$), the ECU 20 determines level 2 as the notification level. At level 2, the volume of the horn is set to "volume 1", the hazard lamps are blinked at "period 2" shorter than period 1, and no taillights are used as the notification devices.

Figure 5C:
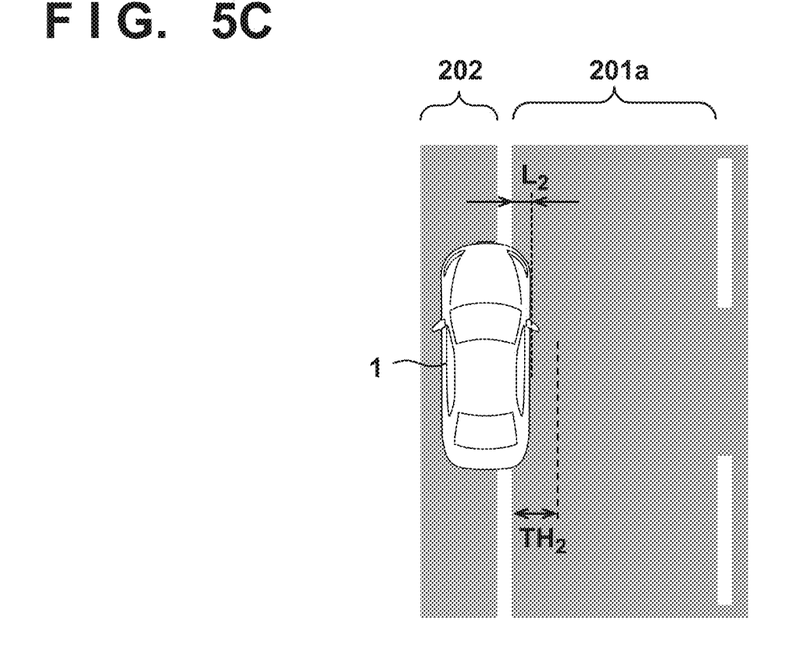
FIG. 5C is a schematic view showing still another example of the stop position of the vehicle.
Figure 5D:
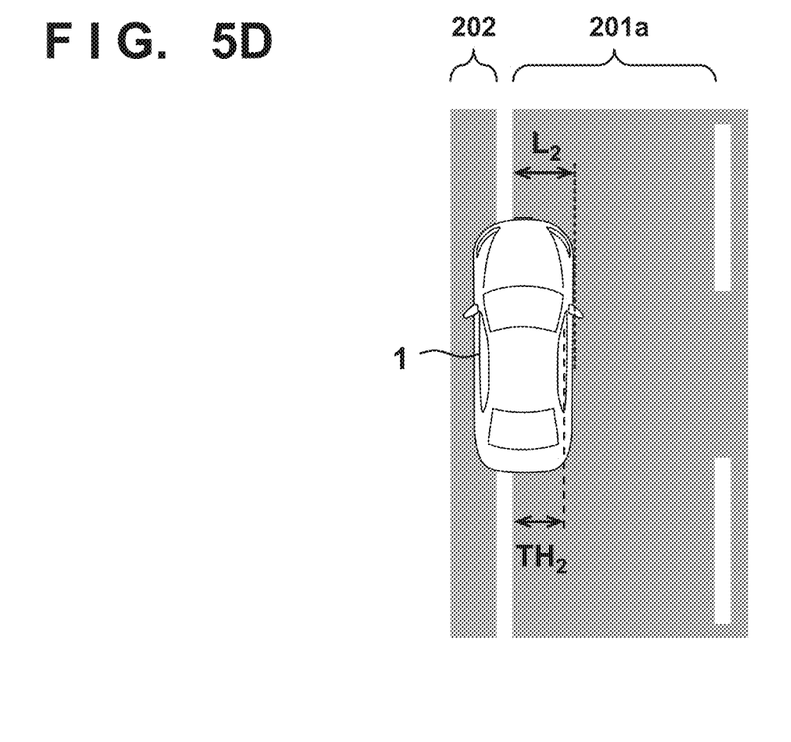
FIG. 5D is a schematic view showing still another example of the stop position of the vehicle.

On the other hand, if the relative position between the vehicle 1 and the traveling lane 201$a$ is in a state shown in FIG. 5C (a deviation amount $L_2$ of the vehicle 1 falls within the range of zero (inclusive) to a second threshold $TH_2$ (exclusive) ($0 \leq L_2 < TH_2$), the ECU 20 determines level 3 as the notification level. At level 3, the volume of the horn is set to "volume 2" larger than volume 1, and the hazard lamps are blinked at "period 3" shorter than period 2. At this time, the taillights are blinked at "period 3" which is the same as the period of the hazard lamps. Furthermore, if the relative position between the vehicle 1 and the traveling lane 201$a$ is in a state shown in FIG. 5D ($L_2 \geq TH_2$), the ECU 20 determines level 4 as the notification level. At level 4, the volume of the horn is set to "volume 3" larger than volume 2, and the hazard lamps and the taillights are blinked at "period 4" shorter than period 3. At level 4, the light emission intensities of the hazard lamps and taillights may be set higher than those at level 3. The thresholds (first threshold $TH_1$ and second threshold $TH_2$) can arbitrarily be set.

Referring back to the flowchart shown in FIG. 3, in step S15, the ECU 20 acquires, as the stop mode (stop environment), traffic (the number or frequency of other vehicles passing by the vehicle 1) on the traveling lane 201$a$ based on the detection results of the detection units 41 to 43, inter-vehicle communication via the communication device 24$d$, and the like, and determines whether the acquired traffic is equal to or higher than a predetermined amount. If it is determined that the traffic is equal to or higher than the predetermined value, the process advances to step S16, and the ECU 20 changes the notification method determined in step S14 to a higher notification level. On the other hand, if it is determined that the traffic is lower than the predetermined value, the process advances to step S17. Step S15 (S16) may be performed before step S13. In this case, the ECU 20 can acquire the traffic on the traveling lane 201$a$ as the stop mode, and change the notification method in accordance with the acquired traffic.

Figure 6:
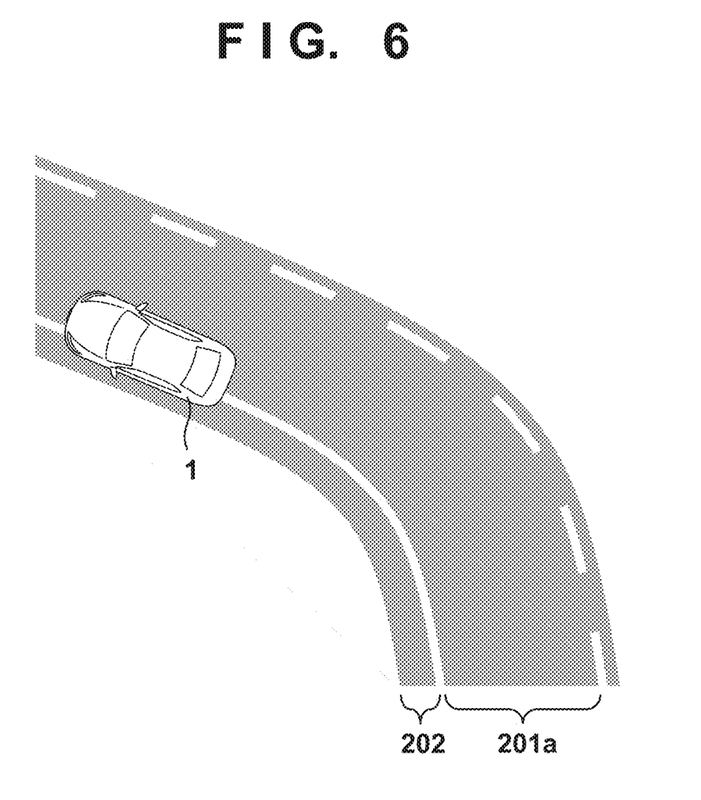
FIG. 6 is a schematic view showing still another example of the stop position of the vehicle.

In step S17, the ECU 20 estimates, as the stop mode (stop environment), the difficulty (to be sometimes referred to as recognition difficulty hereinafter) of recognizing the vehicle 1 from a following vehicle traveling on the traveling lane 201$a$, and determines whether the estimated recognition difficulty is equal to or higher than a predetermined value. For example, as shown in FIG. 6, when stopping the vehicle 1 on a road that curves to the left, it is difficult to recognize the vehicle 1 from a following vehicle traveling on the traveling lane 201$a$. Therefore, the ECU 20 estimates (evaluates) the recognition difficulty of the vehicle 1 from the following vehicle using a predetermined index based on the peripheral information of the vehicle 1 acquired by the detection units 41 to 43 and the communication device 24$c$, and determines whether the estimated recognition difficulty is equal to or higher than the predetermined value. The peripheral information of the vehicle 1 can include at least one of, for example, the road curvature and road gradient of the traveling lane 201$a$, a structure on the road, the environment (for example, the width and the length in the traveling direction of the adjacent zone 202) of a place where the vehicle 1 is stopped, and weather information. The structure on the road can include, for example, a guardrail or a wall. If it is determined that the estimated recognition difficulty is equal to or higher than the predetermined value (that is, it is estimated that it is difficult to recognize the vehicle 1 from the following vehicle), the process advances to step S18, and the notification method determined in step S14 (or the notification method changed in step S16) is changed to a higher notification level. Step S17 (S18) may be performed before step S13 or S15. In this case, the ECU 20 can estimate the recognition difficulty as the stop mode, and change the notification method in accordance with the estimated recognition difficulty.

In step S19, the ECU 20 changes the notification method in accordance with a factor (predetermined condition) of determining to perform the stop processing in step S11. For example, if the ECU 20 performs the stop processing in accordance with a degradation in performance of the vehicle 1 such as a degradation in detection accuracy of the sensor (for example, the detection units 41 to 43) for detecting the peripheral status of the vehicle 1, it can confirm (check) a portion (part) whose performance degrades, and the degree of degradation of the performance of the vehicle 1, for example, whether it is possible to perform improvement, and change the notification method in accordance with the degree of degradation of the performance of the vehicle 1. More specifically, in accordance with the degree of degradation of the performance of the vehicle 1, the notification method can be changed to make emergency communication with a dealer, a towing company, and the like. Furthermore, if the ECU 20 performs the stop processing in accordance with the state (for example, the deterioration of the consciousness of the driver) of the driver detected by the detection unit 9 such as the camera 9$a$ or the biosensor, the notification method can be changed to further make emergency communication with a fire station. At this time, for example, the notification method may be changed to notify, by the output unit 8$b$ (loudspeaker), the outside of the vehicle of information (a voice and the like) for asking rescue of the driver.

The ECU 20 may change the notification method in accordance with the place where the stop processing is performed in step S11. If, for example, the ECU 20 detects, as the stop mode (stop environment), the stop place of the vehicle 1 by the GPS sensor 24$b$ or the like, and determines, based on a detection result, that the vehicle 1 is stopped in a dangerous place such as an expressway, the notification level can be raised, or the notification method can be changed to further make emergency communication with the outside such as a police station or a road management company.

In step S20, the ECU 20 notifies the driver (occupant) of the stop of the vehicle 1 by outputting a voice from the voice output device 10a or displaying information on the display device 10b such as an instrument panel. The ECU 20 can output, as an in-vehicle notification, information such as "automated driving ends" or "take over driving" by a voice from the voice output device 10a, or display the information on the display device 10b. At this time, the ECU 20 may change the notification method to the driver in accordance with the notification level determined in steps S14 to S19 described above. More specifically, in accordance with the notification level, the ECU 20 can change, as the notification method, the volume of a voice output from the voice output device 10a, contents of information displayed on the display device 10b, the blinking period and the display light amount of the display device 10b, the blinking period and the light amount of an interior light, the pulling amount of a seatbelt, and the like. Furthermore, the change degree (change width) of the notification method for in-vehicle notification with respect to the notification level may be smaller than the change degree of the notification method for outside-vehicle notification. That is, with respect to the stop mode of the vehicle 1, the change degree (change width) of the notification method for outside-vehicle notification may be larger than that for in-vehicle notification. In this embodiment, step S20 is performed after step S19. However, step S20 may be performed before step S14 or performed in parallel to steps S14 to S19.

As described above, in this embodiment, the notification method is changed in accordance with the stop mode of the vehicle 1 when stopping the vehicle 1 traveling on the traveling lane 201a by moving the vehicle 1 in the vehicle width direction. This makes it possible to appropriately notify another vehicle and a pedestrian on the periphery that the vehicle 1 is stopped.

This embodiment has explained the example of detecting the stop position after the vehicle 1 is actually stopped, and changing the notification method in accordance with the detected stop position. The present invention, however, is not limited to this. For example, the ECU 20 may estimate a predicted stop position before the vehicle 1 is actually stopped (that is, during deceleration of the vehicle 1 while the stop processing is performed), and change the notification method in accordance with the estimated predicted stop position. If the predicted stop position is estimated in this way, when the predicted stop position is estimated, notification to the outside of the vehicle 1 can start before the vehicle 1 is actually stopped (during deceleration of the vehicle 1).

Furthermore, this embodiment has explained the example of obtaining the stop position of the vehicle 1 by actually detecting the relative position between the stopped vehicle 1 and the traveling lane 201a and the deviation amount of the stopped vehicle 1 to the traveling lane 201a by the detection units 41 to 43 and the like. The present invention, however, is not limited to this. For example, the stop position of the vehicle 1 may be obtained (estimated) based on the moving amount of the vehicle 1 in the vehicle width direction in the stop processing, that is, the moving amount (steering amount) of the vehicle in the vehicle width direction from when the vehicle 1 is in a state (traveling state) in which the vehicle 1 travels on the traveling lane 201a until the vehicle 1 is set in the stop state. In this case, the ECU 20 can acquire, by the GPS sensor 24b, the detection units 41 to 43, and the like, information about the position of the vehicle 1 in the vehicle width direction on the traveling lane 201a when the vehicle 1 travels on the traveling lane 201a and information about the moving amount of the vehicle 1 in the vehicle width direction in the stop processing, and obtain the stop position of the vehicle 1 based on these pieces of information. At this time, the ECU 20 can change the notification method in accordance with the moving amount of the vehicle 1 in the vehicle width direction in the stop processing. More specifically, the ECU 20 can change the notification method so that the notification level is higher as the moving amount in the vehicle width direction in the stop processing is smaller.

Summary of Embodiment

1. A vehicle control apparatus according to the above-described embodiment is a vehicle control apparatus for controlling traveling of a vehicle (for example, 1), comprising:
   a stop control unit (for example, 20) configured to move the vehicle in a vehicle width direction and stop the vehicle in a traveling state;
   a notification unit (for example, 26) configured to make a notification of the stop of the vehicle; and
   a change unit (for example, 20) configured to change a notification method by the notification unit in accordance with a stop mode of the vehicle stopped by the stop control unit.

According to this embodiment, it is possible to make a notification appropriately when stopping the vehicle.

2. In the above-described embodiment,
   the vehicle control apparatus further comprises a position detection unit (for example, 41-43, 24b) configured to detect a relative position between a traveling lane and the vehicle stopped by the stop control unit, as the stop mode, and
   the change unit changes the notification method in accordance with the relative position detected by the position detection unit.

According to this embodiment, it is possible to determine the influence of the stop position of the vehicle on a periphery using, as an index, the relative position between the vehicle and the traveling lane, and make an appropriate notification in accordance with the influence on the periphery.

3. In the above-described embodiment,
   the change unit changes the notification method so that a notification level is higher as the relative position detected by the position detection unit is closer.

According to this embodiment, it is possible to make a notification appropriately in accordance with the stop position of the vehicle.

4. In the above-described embodiment,
   the vehicle control apparatus further comprises a deviation detection unit (for example, 41-43, 24b) configured to detect a deviation amount, to the traveling lane, of the vehicle stopped by the stop control unit, as the stop mode, and
   the change unit changes the notification method in accordance with the deviation amount detected by the deviation detection unit.

According to this embodiment, it is possible to determine the influence of the stop position of the vehicle on the periphery using, as an index, the deviation amount of the vehicle to the traveling lane, and make an appropriate notification in accordance with the influence on the periphery.

5. In the above-described embodiment,
the change unit changes the notification method so that the notification level is higher as the deviation amount detected by the deviation detection unit is larger.

According to this embodiment, it is possible to make a notification more appropriately in accordance with the stop position of the vehicle.

6. In the above-described embodiment,
the vehicle control apparatus further comprises a moving amount detection unit (for example, 21, 24b) configured to detect a moving amount of the vehicle in the vehicle width direction when stopping the vehicle by the stop control unit, as the stop mode, and
the change unit changes the notification method in accordance with the moving amount detected by the moving amount detection unit.

According to this embodiment, it is possible to determine the influence of the stop position of the vehicle on the periphery using, as an index, the moving amount of the vehicle, and make an appropriate notification in accordance with the influence on the periphery.

7. In the above-described embodiment,
the change unit changes the notification method so that the notification level is higher as the moving amount detected by the moving amount detection unit is smaller.

According to this embodiment, it is possible to make a notification more appropriately in accordance with the stop position of the vehicle obtained from the moving amount of the vehicle.

8. In the above-described embodiment,
the vehicle control apparatus further comprises an estimation unit (for example, 20) configured to estimate recognition difficulty of the vehicle from a following vehicle on the traveling lane, as the stop mode, and
the change unit changes the notification method in accordance with the recognition difficulty estimated by the estimation unit.

According to this embodiment, it is possible to make a more appropriate notification in accordance with the influence of the stop position of the vehicle on the periphery.

9. In the above-described embodiment,
the estimation unit estimates the recognition difficulty based on at least one of a road curvature and a road gradient of the traveling lane, a structure on a road, and weather information.

According to this embodiment, it is possible to estimate the recognition difficulty of the stopped vehicle from the following vehicle more accurately.

10. In the above-described embodiment,
the change unit changes the notification method so that the notification level is higher as the recognition difficulty estimated by the estimation unit is higher.

According to this embodiment, it is possible to make a notification more appropriately in accordance with the stop position of the vehicle.

11. In the above-described embodiment,
the vehicle control apparatus further comprises a traffic detection unit (for example, 41-43, 24d) configured to detect traffic on the traveling lane, as the stop mode, and
the change unit changes the notification method in accordance with the traffic detected by the traffic detection unit.

According to this embodiment, it is possible to make a more appropriate notification in accordance with the influence of the stop position of the vehicle on the periphery.

12. In the above-described embodiment,
the notification unit notifies at least one of a periphery of the vehicle and an occupant in the vehicle, of the stop of the vehicle, and
the change unit changes the notification method to the at least one.

According to this embodiment, it is possible to make an appropriate notification not only to the periphery of the vehicle but also to the occupant (for example, a driver) in the vehicle in accordance with the stop position of the vehicle.

13. In the above-described embodiment,
the change unit changes, as the notification method, at least one of an output volume, a type of a notification device, and a blinking period and a light amount of a lighting device.

According to this embodiment, it is possible to improve the degree of recognition of the stopped vehicle on the periphery of the vehicle or by the occupant in the vehicle.

14. In the above-described embodiment,
the vehicle control apparatus further comprises a state detection unit (for example, 9) configured to detect a state of a driver of the vehicle, and
the change unit changes the notification method in accordance with the state of the driver detected by the state detection unit.

According to this embodiment, it is possible to make an appropriate notification in accordance with the state of the driver such as the deterioration of the consciousness.

15. In the above-described embodiment,
the vehicle control apparatus further comprises a performance detection unit (for example, 20) configured to detect a degree of degradation of performance of the vehicle, and
the change unit changes the notification method in accordance with the degree of degradation of the performance of the vehicle detected by the performance detection unit.

According to this embodiment, it is possible to make an appropriate notification in accordance with the degradation of the performance of the vehicle (for example, a sensor or the like).

16. In the above-described embodiment,
the vehicle control apparatus further comprises a place detection unit (for example, 24b) configured to detect a stop place of the vehicle, as the stop mode, and
the change unit changes the notification method in accordance with the stop place of the vehicle detected by the place detection unit.

According to this embodiment, it is possible to make an appropriate notification in accordance with the risk of the place where the vehicle is stopped, and the like.

17. A vehicle control apparatus according to the above-described embodiment is a vehicle control apparatus for controlling traveling of a vehicle (for example, 1), comprising:
a stop control unit (for example, 20) configure to move the vehicle in a vehicle width direction and stop the vehicle in a traveling state;
an estimation unit (for example, 20) configured to estimate a predicted stop position of the vehicle by the stop control unit;
a notification unit (for example, 26) configured to make a notification of the stop of the vehicle; and a change unit (for example, 20) configured to change a notification method by the notification unit in accordance with the predicted stop position of the vehicle estimated by the estimation unit.

According to this embodiment, it is possible to make a notification appropriately when stopping the vehicle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

1 . . . vehicle, 2 . . . control unit, 20 . . . ECU, 41 . . . camera, 42 . . . lidar, 43 . . . radar

The invention claimed is:

1. A vehicle control apparatus for controlling traveling of a vehicle, the apparatus comprising:
 a stop control unit configured to move the vehicle traveling on a traveling lane in a vehicle width direction and stop the vehicle;
 a deviation detection unit configured to detect a deviation amount indicating an amount by which the vehicle stopped by the stop control unit crosses over the traveling lane;
 a notification unit configured to make a notification of the stop of the vehicle; and
 a change unit configured to change a notification method by the notification unit,
 wherein the change unit changes the notification method in accordance with the deviation amount detected by the deviation detection unit.

2. The vehicle control apparatus according to claim 1, further comprising a position detection unit configured to detect a distance between a traveling lane and the vehicle stopped by the stop control unit in a case where the deviation amount of the vehicle is less than zero,
 wherein the change unit changes the notification method in accordance with the distance detected by the position detection unit.

3. The vehicle control apparatus according to claim 2, wherein the change unit changes the notification method so that a notification level is higher as the distance detected by the position detection unit is shorter.

4. The vehicle control apparatus according to claim 1, wherein the change unit changes the notification method so that the notification level is higher as the deviation amount detected by the deviation detection unit is larger.

5. The vehicle control apparatus according to claim 1, further comprising a moving amount detection unit configured to detect a moving amount of the vehicle in the vehicle width direction when stopping the vehicle by the stop control unit,
 wherein the change unit changes the notification method in accordance with the moving amount detected by the moving amount detection unit.

6. The vehicle control apparatus according to claim 5, wherein the change unit changes the notification method so that the notification level is higher as the moving amount detected by the moving amount detection unit is smaller.

7. The vehicle control apparatus according to claim 1, further comprising an estimation unit configured to estimate recognition difficulty of the vehicle from a following vehicle on the traveling lane,
 wherein the change unit changes the notification method in accordance with the recognition difficulty estimated by the estimation unit.

8. The vehicle control apparatus according to claim 7, wherein the estimation unit estimates the recognition difficulty based on at least one of a road curvature and a road gradient of the traveling lane, a structure on a road, and weather information.

9. The vehicle control apparatus according to claim 7, wherein the change unit changes the notification method so that the notification level is higher as the recognition difficulty estimated by the estimation unit is higher.

10. The vehicle control apparatus according to claim 1, further comprising a traffic detection unit configured to detect traffic on the traveling lane,
 wherein the change unit changes the notification method in accordance with the traffic detected by the traffic detection unit.

11. The vehicle control apparatus according to claim 1, wherein
 the notification unit notifies at least one of a periphery of the vehicle and an occupant in the vehicle, of the stop of the vehicle, and
 the change unit changes the notification method to the at least one.

12. The vehicle control apparatus according to claim 1, wherein the change unit changes, as the notification method, at least one of an output volume, a type of a notification device, and a blinking period and a light amount of a lighting device.

13. The vehicle control apparatus according to claim 1, further comprising a state detection unit configured to detect a state of a driver of the vehicle,
 wherein the change unit changes the notification method in accordance with the state of the driver detected by the state detection unit.

14. The vehicle control apparatus according to claim 1, further comprising a performance detection unit configured to detect a degree of degradation of performance of the vehicle,
 wherein the change unit changes the notification method in accordance with the degree of degradation of the performance of the vehicle detected by the performance detection unit.

15. The vehicle control apparatus according to claim 1, further comprising a place detection unit configured to detect a stop place of the vehicle,
 wherein the change unit changes the notification method in accordance with the stop place of the vehicle detected by the place detection unit.

16. A vehicle comprising a vehicle control apparatus according to claim 1.

17. A control method of controlling traveling of a vehicle, the method comprising:
 moving the vehicle traveling on a traveling lane in a vehicle width direction and stopping the vehicle;
 detecting a deviation amount indicating an amount by which the vehicle stopped by the stop control unit crosses over the traveling lane; and
 making a notification of the stop of the vehicle,
 wherein in the making the notification, a notification method is changed in accordance with the detected deviation amount.

* * * * *